(12) United States Patent
Zhang et al.

(10) Patent No.: US 12,425,330 B2
(45) Date of Patent: Sep. 23, 2025

(54) INFORMATION ADVERTISEMENT METHOD, PACKET FORWARDING METHOD, PACKET TRANSMISSION METHOD, DEVICE, AND MEDIUM

(71) Applicant: ZTE CORPORATION, Shenzhen (CN)

(72) Inventors: Zheng Zhang, Shenzhen (CN); Shaofu Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 215 days.

(21) Appl. No.: 18/014,323

(22) PCT Filed: Mar. 4, 2021

(86) PCT No.: PCT/CN2021/079069
§ 371 (c)(1),
(2) Date: Jan. 3, 2023

(87) PCT Pub. No.: WO2022/001152
PCT Pub. Date: Jan. 6, 2022

(65) Prior Publication Data
US 2023/0246947 A1    Aug. 3, 2023

(30) Foreign Application Priority Data
Jul. 3, 2020 (CN) .......................... 202010636348.5

(51) Int. Cl.
*H04L 45/16* (2022.01)
*H04L 12/18* (2006.01)
(Continued)

(52) U.S. Cl.
CPC .......... *H04L 45/16* (2013.01); *H04L 12/1886* (2013.01); *H04L 41/12* (2013.01); *H04L 45/036* (2022.05)

(58) Field of Classification Search
CPC ..... H04L 45/16; H04L 12/1886; H04L 41/12; H04L 45/036; H04L 45/243; H04L 45/02;
(Continued)

(56) References Cited

U.S. PATENT DOCUMENTS 9,544,240 B1 * 1/2017 Przygienda ......... H04L 12/1863
2015/0131660 A1   5/2015 Shepherd et al.
(Continued)

FOREIGN PATENT DOCUMENTS

CN   103825818 A   5/2014
CN   106572023 A   4/2017
(Continued)

OTHER PUBLICATIONS

Extended European Search Report in Application No. 21832891.2, dated Jun. 20, 2024, 14 pages.
(Continued)

*Primary Examiner* — Karen C Tang
(74) *Attorney, Agent, or Firm* — Morgan, Lewis & Bockius LLP (57) ABSTRACT

Provided are an information advertisement method and apparatus, a packet forwarding method and apparatus, a packet cancellation method and apparatus, a device, and a medium. The information advertisement method includes associating a particular topology identifier with a BIER forwarding plane in a case where a particular topology is constructed; and advertising BIER information to a network, where the BIER information carries the particular topology identifier, and the BIER information is configured to be used by a node in the network to generate a BIER forwarding table entry corresponding to the particular topology.

7 Claims, 5 Drawing Sheets

---

Encapsulate a particular topology identifier into a BIER packet header when encapsulating a to-be-forwarded data packet — S21

Determine a BIER forwarding table entry associated with the particular topology identifier — S22

Forward the encapsulated to-be-forwarded data packet to the next-hop node based on the BIER forwarding table entry — S23

(51) Int. Cl.
*H04L 41/12* (2022.01)
*H04L 45/036* (2022.01)

(58) Field of Classification Search
CPC ..... H04L 45/34; H04L 12/18; H04L 41/0893; H04L 45/505; H04L 45/54
USPC ........................................................ 709/231
See application file for complete search history.

(56) References Cited

U.S. PATENT DOCUMENTS

| | | | | |
|---|---|---|---|---|
| 2016/0127139 | A1* | 5/2016 | Tian | H04L 45/16 370/390 |
| 2016/0127142 | A1* | 5/2016 | Tian | H04L 45/50 370/390 |
| 2019/0297000 | A1* | 9/2019 | Dutta | H04L 45/16 |
| 2020/0053000 | A1 | 2/2020 | Zhang et al. | |

FOREIGN PATENT DOCUMENTS

| | | |
|---|---|---|
| CN | 109510771 A | 3/2019 |
| CN | 110535768 A | 12/2019 |
| CN | 110581806 A | 12/2019 |
| WO | WO2018/010658 A1 | 1/2018 |

OTHER PUBLICATIONS

IJ Wijnands et al: "Multicast Using Bit Index Explicit Replication (BIER); rfc8279.txt", Multicast Using Bit Index Explicit Replication (BIER); RFC8279.TXT, Internet Engineering Task Force, IETF; Standard, Internet Society (ISOC) 4, Rue Des Falaises CH—1205 Geneva, Switzerland, Nov. 20, 2017, pp. 1-43.
11 802.ICB Frame Replication and Elimination 14, 15 for Reliability ED—Darl Kuhn, ip.com, ip.com Inc., West Henrietta, NY, US, Jan. 10, 2019.
Shaofu Peng Zheng Zhang ZTE Corporation: "Global vpnid advertisement in BIER overlay; draft-pengzhang-bier-global-vpnid-00. txt", Global VPNID Advertisement in BIER Overlay; draft-pengzhang-bier-global-vpnid-00.txt; Internet-Draft: BIER, Internet Engineering Task Force, IETF; Standardworkingdraft, Internet Society (ISOC) 4, Rue Des Falaises CH—1205 Geneva, Switzerland, Jun. 28, 2018 (Jun. 28, 2018), pp. 1-6.
International Search Report in Application No. PCT/ CN2021/ 079069 dated May 26, 2021, 4 pages including translation.
Chinese Search Report for Application No. 2020106363485, dated Mar. 22, 2024, 6 pages including translation.
Chinese Office Action for Application No. 202010636348.5, dated Mar. 26, 2024, 10 pages including translation.
Wijnands et al., "Multicast Using Bit Index Explicit Replication (BIER)", Internet Engineering Task Force, Request for Comments: 8279, ISSN: 2070-1721, Nov. 2017, 43 pages.
Xinting, Wu, "Research and Simulation of HF-BIER Protocol", Beijing University of Posts and Telecommunications, Thesis for Master Degree, Jun. 10, 2019, 92 pages.

* cited by examiner

| Type | Length |
|------|--------|
| AI identifier ||

FIG. 7

| Type | Length |
|------|--------|
| Slice-ID ||

INFORMATION ADVERTISEMENT METHOD, PACKET FORWARDING METHOD, PACKET TRANSMISSION METHOD, DEVICE, AND MEDIUM

CROSS REFERENCE TO RELATED APPLICATIONS

This is a National Stage Application filed under 35 U.S.C. 371, based on International Patent Application No. PCT/CN2021/079069, filed on Mar. 4, 2021, which claims priority to Chinese Patent Application No. 202010636348.5 filed with the China National Intellectual Property Administration (CNIPA) on Jul. 3, 2020, the disclosures of which are incorporated herein by reference in their entireties.

TECHNICAL FIELD

The present application relates to the field of communication technology, for example, an information advertisement method and apparatus, a packet forwarding method and apparatus, a packet cancellation method and apparatus, a device, and a medium.

BACKGROUND

The multicast technology is increasingly widely used on the Internet and for example, applied to multi-party conferences, distance education, telemedicine, and livestreaming. The widespread use of the multicast technology requires the development and improvement of the multicast technology.

SUMMARY

The present application provides an information advertisement method and apparatus, a packet forwarding method and apparatus, a packet cancellation method and apparatus, a device, and a medium, thereby combining the control plane slice technology and a new multicast technology, the bit indexed explicit replication (BIER) technology.

An embodiment of the present application provides an information advertisement method.

The information advertisement method includes associating a particular topology identifier with a BIER forwarding plane when constructing a particular topology; and advertising BIER information to a network, where the BIER information carries the particular topology identifier, and the BIER information is configured to be used by a node in the network to generate a BIER forwarding table entry corresponding to the particular topology.

An embodiment of the present application provides a packet forwarding method. The packet forwarding method is applied to a first node.

The packet forwarding method includes encapsulating a particular topology identifier into a BIER packet header when a to-be-forwarded data packet is encapsulated; determining a BIER forwarding table entry associated with the particular topology identifier; and forwarding the encapsulated to-be-forwarded data packet to the next-hop node based on the BIER forwarding table entry.

An embodiment of the present application provides a packet forwarding method. The packet forwarding method is applied to a second node.

The packet forwarding method includes receiving a data packet forwarded by the previous-hop node; and in response to identifying that a packet header of the data packet carries a special topology identifier, providing, for the data packet, processing matching the special topology identifier.

An embodiment of the present application provides a packet transmission method. The packet transmission method is applied to a first node.

The packet transmission method includes copying a received data packet; and forwarding the copied data packet to the next-hop node through different BIER transmission paths.

An embodiment of the present application provides a packet cancellation method. The packet cancellation method is applied to a second node.

The packet cancellation method includes receiving a data packet forwarded by the previous-hop node; and in response to receiving a plurality of identical data packets in different transmission paths, reserving one of the plurality of identical data packets and cancelling received data packets other than the one of the plurality of identical data packets.

An embodiment of the present application provides an information advertisement apparatus. The information advertisement apparatus includes an association module and an advertisement module.

The association module is configured to associate a particular topology identifier with a BIER forwarding plane when constructing a particular topology. The advertisement module is configured to advertise BIER information to a network, where the BIER information carries the particular topology identifier, and the BIER information is configured to be used by a node in the network to generate a BIER forwarding table entry corresponding to the particular topology.

An embodiment of the present application provides a packet forwarding apparatus. The packet forwarding apparatus is configured on a first node. The packet forwarding apparatus includes an encapsulation module, a forwarding table entry determination module, and a first forwarding module.

The encapsulation module is configured to encapsulate a particular topology identifier into a BIER packet header when a to-be-forwarded data packet is encapsulated. The forwarding table entry determination module is configured to determine a BIER forwarding table entry associated with the particular topology identifier. The first forwarding module is configured to forward the encapsulated to-be-forwarded data packet to the next-hop node based on the BIER forwarding table entry.

An embodiment of the present application provides a packet forwarding apparatus. The packet forwarding apparatus is configured on a second node. The packet forwarding apparatus includes a first receiving module and a processing module.

The first receiving module is configured to receive a data packet forwarded by the previous-hop node. The processing module is configured to, in response to identifying that a packet header of the data packet carries a special topology identifier, provide, for the data packet, processing matching the special topology identifier.

An embodiment of the present application provides a packet transmission apparatus. The packet transmission apparatus is configured on a first node. The packet transmission apparatus includes a second receiving module and a second forwarding module.

The second receiving module is configured to copy a received data packet. The second forwarding module is configured to forward the copied data packet to the next-hop node through different BIER transmission paths.

An embodiment of the present application provides a packet cancellation apparatus. The packet cancellation apparatus is configured on a second node. The packet cancellation apparatus includes a third receiving module and a third forwarding module.

The third receiving module is configured to receive a data packet forwarded by the previous-hop node. The third forwarding module is configured to, in response to receiving a plurality of identical data packets in different transmission paths, reserving one of the plurality of identical data packets and cancelling received data packets other than the one of the plurality of identical data packets.

An embodiment of the present application provides a device.

The device includes at least one processor; and a memory configured to store at least one program. The at least one processor is configured to execute the at least one program to perform the method of any embodiment of the present application.

An embodiment of the present application provides a storage medium. The storage medium stores a computer program which, when executed by a processor, causes the processor to perform the method of any embodiment of the present application.

In a solution of embodiments of the present application, the information advertisement method includes associating a particular topology identifier with a BIER forwarding plane when constructing a particular topology; and advertising BIER information to a network, where the BIER information carries the particular topology identifier, and the BIER information is configured to be used by a node in the network to generate a BIER forwarding table entry corresponding to the particular topology. The particular identifier includes at least one of the following: an administrative instance (AI) identifier or a slice identifier, thereby combining the control plane slice technology and a new multicast technology—the BIER technology.

DETAILED DESCRIPTION

Embodiments of the present application are described in detail hereinafter with reference to drawings.

Steps illustrated in a flowchart among the drawings may be performed by, for example, a computer system capable of executing a set of computer-executable instructions. Moreover, a logical sequence is illustrated in the flowchart, but in some cases, the illustrated or described steps may be performed in a sequence different from the sequence described herein.

The multicast technology is increasingly widely used on the Internet and for example, applied to multi-party conferences, distance education, telemedicine, and livestreaming. The widespread use of the multicast technology promotes the development and improvement of the multicast technology.

Bit indexed explicit replication (BIER) (Request for Comments (RFC) 8279) is a new multicast data forwarding technology. In BIER, nodes at the network edge are each indicated by one bit, multicast traffic is transmitted in an intermediate network, and a particular BIER packet header is additionally encapsulated. The BIER packet header marks, in the form of a bit string, all destination nodes of the multicast traffic. Intermediate forwarding nodes are routed according to bits to ensure that the multicast traffic can be sent to all destination nodes. An intermediate forwarding node floods and sends node information in advance by using an internal protocol, for example, Babel protocol, Border Gateway Protocol (BGP), Intermediate System-to-Intermediate System (ISIS) protocol, or Open Shortest Path First (OSPF) protocol in a three-layer network; forms a bit index forwarding table (BIFT) for guiding BIER forwarding; and performs forwarding from a packet to a destination node when receiving traffic with an encapsulated BIER packet header.

The BIER data plane forwarding technology does not have the problem of establishment of a multicast tree, eliminating a delay of the establishment of the multicast tree. Moreover, for BIER, when a link or node problem occurs in a network, the convergence speed is the same as OSPF and ISIS, bringing about a much shorter delay than the original reestablishment of the multicast tree. A protocol such as the OSPF protocol, the ISIS protocol, or the BGP for establishing a BIER forwarding table entry is referred to as the underlay technology of BIER.

At the time of transmission, the BIER technology requires to encapsulate only one piece of multicast traffic in a BIER packet and transmit the encapsulated multicast traffic as a payload. For an ingress node (bit-forwarding ingress router (BFIR)) of the BFIR domain, it is required to know which egress nodes (bit-forwarding egress routers (BFERs)) require this piece of multicast traffic. Thus, only after a BFER receives this piece of multicast traffic, can this piece of multicast traffic be forwarded to a receiver that requires to receive this piece of multicast traffic. Between the BFIR and the BFERs, the BFIR can learn of BFERs corresponding to one piece of multicast traffic by using static configuration or by adopting a protocol of a dynamic advertisement. This is referred to as the BIER overlay technology. The overlay technology is closely related to services such as multicast virtual private network (MVPN) and Ethernet virtual private network (EVPN) services in addition to ordinary multicast traffic services. These services can all use BIER as a forwarding plane to implement transmission of private network multicast traffic in MVPN and layer 2/3 broadcast, unknown unicast, multicast (BUM) in EVPN.

The slice technology is oriented to 5th-generation (5G) networks. The slice technology can provide an isolated network environment for different application scenarios. Additionally, the slice technology has the advantage of allowing a network operator to select features of each slice. These features include low delay, high throughput, connection density, spectral efficiency, traffic capacity, and network efficiency. These features require to be implemented a network in the transport layer.

When the slice technology provides a service to a user, multicast is a very common application scenario, and the two can be used in combination through a conventional multicast technology such as protocol independent multicast (PIM). However, the PIM protocol has disadvantages in network failure convergence and service deployment complexity and thus cannot provide a high-quality service for the slice technology. Therefore, the combination of the slice technology and the new multicast technology BIER is an inevitable result. However, problems remain to be solved, for example, how to combine the BIER technology on the control plane and how to identify a slice on the data plane.

In view of these problems, solutions are provided below.

Figure 1:
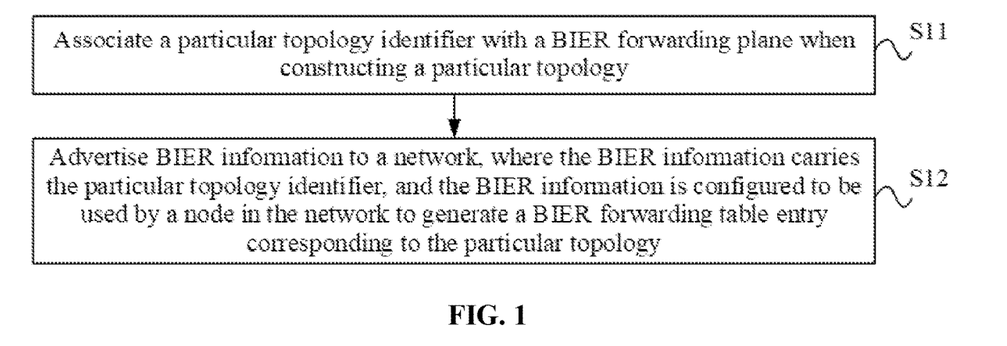
FIG. 1 is a flowchart of an information advertisement method according to an embodiment of the present application.

In an embodiment, an information advertisement method is provided. As shown in FIG. 1, the information advertisement method of this embodiment includes S11 and S12.

The information advertisement method of this embodiment may be performed by any node in a BIER domain. The any node includes an ingress node, an intermediate forwarding node, and an egress node in the BIER domain.

In S11, a particular topology identifier is associated with a BIER forwarding plane when a particular topology is constructed.

In S12, BIER information is advertised to a network, where the BIER information carries the particular topology identifier, and the BIER information is configured to be used by a node in the network to generate a BIER forwarding table entry corresponding to the particular topology.

In this embodiment, the BIER information is advertised by a routing protocol, and the particular topology identifier is extended and advertised in the routing protocol. After the BIER information is advertised to nodes in the network, each node generates a BIER forwarding table entry based on the BIER information.

When the BIER information carries the particular topology identifier, the BIER forwarding table entry corresponding to the particular topology is generated. For details, reference is made to the description in the embodiments below.

In an example embodiment, the particular topology identifier includes at least one of the following: an administrative instance (AI) identifier or a slice identifier.

In this embodiment, information such as the slice identifier or the administrative instance identifier (AII) may be used independently or may be mapped to a slice to represent a slice. The particular topology identifier may be, for example, a slice value or the AII. The AII and the AI identifier are the same information. The slice identifier may be a slice number.

In an example embodiment, the BIER information carries only the AI identifier when a mapping exists between the AI identifier and the slice identifier.

It is feasible to advertise only an AII value in the extension advertisement of the routing protocol of BIER when the slice has been mapped to the AII.

In an example embodiment, associating the particular topology identifier with the BIER forwarding plane includes at least one of the following: associating the particular topology identifier with a subdomain (SD) in a BIER domain; associating the particular topology identifier with a bit forwarding router (BFR) prefix in a BIER domain; associating the particular topology identifier with a bit forwarding router identifier in a BIER domain; associating the particular topology identifier with a BIER domain; or associating the particular topology identifier with a particular topology of a subdomain in a BIER domain.

When an underlay layer of BIER forwarding, such as the interior gateway protocol (IGP), the BGP, the BABEL protocol or other routing protocol, is established, and the BIER particular topology is constructed, related parameters such as the AI and the slice are associated with the BIER forwarding plane in the manners below.

(1) The related parameters are associated with a subdomain in a BIER domain.

(2) The related parameters are associated with a BIER BFR prefix or a BFR-ID in a BIER domain.

(3) The related parameters are associated with a BIER domain.

(4) The related parameters are associated with a particular topology in a BIER SD.

If one-to-one association is performed in manners (1), (2), and (3), the data plane extension mode in the embodiment below may not be used. If association is performed in manner (4), the data plane extension mode in the embodiment below is required.

In an example embodiment, when multiple slice identifiers are associated with one subdomain in the BIER domain, the BIER information carries a sub-type-length-value (sub-TLV) field of each slice identifier.

Figure 2:
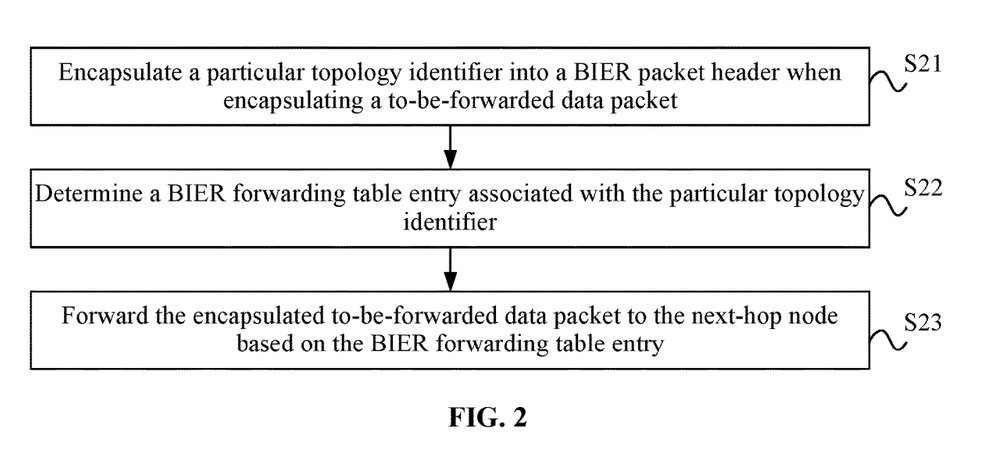
FIG. 2 is a flowchart of a packet forwarding method according to an embodiment of the present application.

In an embodiment, a packet forwarding method is provided. As shown in FIG. 2, the packet forwarding method of this embodiment includes S21, S22, and S23. The packet forwarding method is applied to a first node.

In S21, a particular topology identifier is encapsulated into a BIER packet header when a to-be-forwarded data packet is encapsulated.

In S22, a BIER forwarding table entry associated with the particular topology identifier is determined.

In S23, the encapsulated to-be-forwarded data packet is forwarded to the next-hop node based on the BIER forwarding table entry.

In this embodiment, the first node is an ingress node in a BIER domain. When BIER data plane processing is performed, the packet is encapsulated at the ingress node according to the particular topology identifier information.

In an example embodiment, encapsulating the particular topology identifier into the BIER packet header includes at least one of the following: implicitly carrying the particular topology identifier in the BIER packet header; or explicitly carrying the particular topology identifier in the BIER packet header.

When one-to-one association is performed between the particular topology and the BIER SD, BFR-prefix, or BFR- ID, the particular topology identifier is implicit in the subdomain, BFR-prefix, or BFR-ID or in an identifier value such as a BIFT-ID for guiding BIER forwarding. In this case, the particular topology identifier is not required to be explicitly carried in a BIER packet, and the preceding correspondence may be made explicit at the configuration level.

For example, one subdomain is configured to be bound to a particular slice. For example, there are multiple subdomains on one node, and it is feasible to configure SD1 to be bound to slice 0 and configure SD0 to be bound to slice 1.

By configuration or in another manner, an element such as the BIFT-ID for guiding forwarding and service assurance is bound to the slice. That is, one BIFT-ID value is valid for only one slice.

In an example embodiment, explicitly carrying the particular topology identifier in the BIER packet header includes at least one of the following: indicating the particular topology identifier by using a preset number of bits in a BIFT identifier; indicating the particular topology identifier by using a preset number of bits in an entropy field in the BIER packet header; or indicating the particular topology identifier by using a preset number of bits in a reserved field in the BIER packet header.

In this embodiment, the preset number of bits may be determined by the number of network slices.

In an example embodiment, in the case where a node in a network does not have the capability of processing the particular topology identifier, explicitly carrying the particular topology identifier in the BIER packet header includes at least one of the following: setting the most significant bit in a reserved field in the BIER packet header to a first state; setting the most significant bit in an entropy field in the BIER packet header to a first state; or setting the most significant bit in a BIFT identifier to a first state, where the first state is configured to indicate that the to-be-forwarded data packet requires to be processed by using the particular topology identifier.

The first state may be a binary character "1".

In an example embodiment, implicitly carrying the particular topology identifier in the BIER packet header includes at least one of the following: in the case where the particular topology identifier is in one-to-one association with a subdomain in a BIER domain, implicitly carrying the particular topology identifier in the subdomain in the BIER domain; in the case where the particular topology identifier is in one-to-one association with a bit forwarding router prefix in a BIER domain, implicitly carrying the particular topology identifier in the bit forwarding router prefix in the BIER domain; or in the case where the particular topology identifier is in one-to-one association with a bit forwarding router identifier in a BIER domain, implicitly carrying the particular topology identifier in the bit forwarding router identifier in the BIER domain.

When one-to-one association cannot be performed between the particular topology and the BIER SD, BFR-prefix, or BFR-ID, the particular topology identifier is written into the BIER packet by overwriting the BIFT or entropy or in another manner. The particular topology identifier occupying 8 bits is taken as an example for illustration below.

8 bits of the BIFT-ID in the BIER header indicate the particular topology identifier information. The remaining 12 bits of the BIFT-ID in the BIER header indicate the original BIFT-ID information. Generally, the assigned BIFT-ID value in the network is much smaller than 4096, so the two can be encoded into one field simultaneously.

8 bits of the entropy field in the BIER header indicate the particular topology identifier information. The remaining 12 bits of the entropy field in the BIER header indicate the original entropy information. This combination does not affect the implementation of load balancing.

When the node in the network cannot directly support processing of the identifier information, one bit of the reserved field in the BIER header is set to 1 to indicate that the packet requires processing of the particular topology identifier information.

If the node in the network cannot directly support the identifier processing and the reserved field is not used for the indication, the most significant bit of the BIFT-ID or entropy may be used for the indication. For example, the most significant bit of the BIFT-ID or entropy is set to 1 to indicate that the packet carries the identifier information. 8 bits of the BIFT-ID or entropy indicate the identifier information value. The remaining 11 bits of the BIFT-ID or entropy indicate the original BIFT-ID or entropy value. In this case, the assigned BIFT-ID or entropy value in the network is smaller than 2048.

When a field such as the BIFT-ID or entropy is rewritten, the rewritten particular topology identifier information may also be the slice value, a flex-algo identifier (FAID) value, or the AII value.

Figure 3:
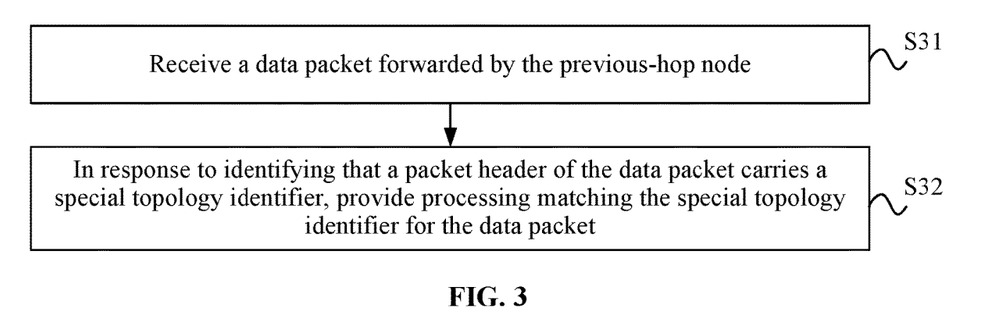
FIG. 3 is a flowchart of a packet forwarding method according to an embodiment of the present application.

In an embodiment, a packet forwarding method is provided. As shown in FIG. 3, the packet forwarding method of this embodiment includes S31 and S32. The packet forwarding method is applied to a second node.

In S31, a data packet forwarded by the previous-hop node is received.

In S32, in response to identifying that a packet header of the data packet carries a special topology identifier, processing matching the special topology identifier is provided for the data packet.

In this embodiment, the second node is an intermediate forwarding node or an egress node.

After the second node receives the BIER data packet and identifies a particular topology identifier in the packet, the matching processing, for example, differentiated assurance processing of delays or bandwidths, is provided according to the corresponding particular topology identifier. Thus, the BIER technology can be combined with a particular topology such as an FA, an AI, or a slice so that BIER can provide particular topology transmission and provide differentiated assurance services for the packets.

In the case where the second node is an intermediate forwarding node, the intermediate forwarding node BFR receives the data packet and identifies whether there is a particular topology identifier such as an AII. If the packet contains an AII, the second node identifies the AII, performs processing according to the corresponding BIER forwarding table entry, provides a corresponding service assurance function, and forwards the packet to the next-hop node according to the corresponding BIER forwarding table entry.

In the case where the second node is an egress node BFER, the BFER receives the data packet and identifies whether there is a particular topology identifier such as an AII. If the packet contains an AII, the second node identifies the AII, performs processing according to the corresponding BIER forwarding table entry, performs service assurance of delays or bandwidths, removes the BIER header from the packet, and forwards the packet to a user according to the inner-layer packet.

Figure 4:
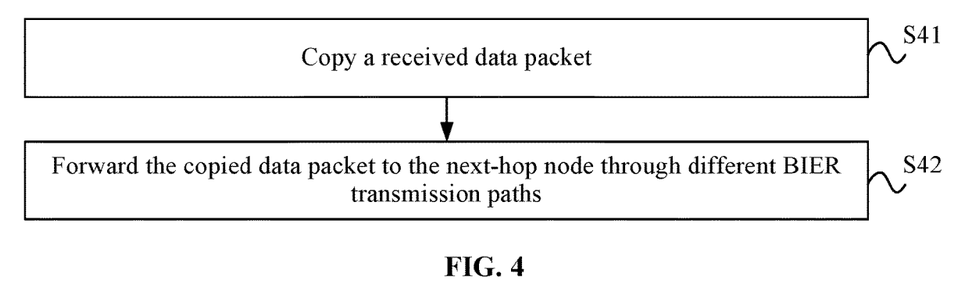
FIG. 4 is a flowchart of a packet transmission method according to an embodiment of the present application.

In an embodiment, a packet transmission method is provided. As shown in FIG. 4, the packet transmission method of this embodiment includes S41 and S42. The method is applied to a first node.

In S41, a received data packet is copied.

In S42, the copied data packet is forwarded to the next-hop node through different BIER transmission paths.

The first node is an ingress node.

To make sure that a packet can reach the destination, it is common practice to send two or more copied packets in different paths and cancel a duplicate packet at the destination node. This function is typically used for the requirements of protection or deterministic transmission. BIER may be divided into subdomains according to a principle or may be combined with a slice, an FA, or an AI to assure the transmission requirements of a user through different particular topologies.

In an example embodiment, copying the received data packet includes in the case where the data packet is protected by a first particular topology and a second particular topology, copying the received data packet.

In an example embodiment, transmitting the copied data packet through the different BIER transmission paths includes setting multiple subdomains in the BIER to transmission planes which are backups of each other; and transmitting the copied data packet in the multiple subdomains.

Two subdomains of BIER are configured to be two transmission planes being backups of each other. After the packet is copied at the ingress BFIR, the packet is transmitted in the two subdomains. Due to the particular topology, the two SDs serve as transmission planes being backups of each other, not related to the slice technology. The transmission planes are provided for only BIER deterministic forwarding.

In an example embodiment, transmitting the copied data packet through the different BIER transmission paths includes setting multiple slices to be transmission planes which are backups of each other; and transmitting the copied data packet in particular topologies corresponding to the multiple slices.

Two slices are configured to be two transmission planes being backups of each other. After the packet is copied at the ingress BFIR, the packet is transmitted in the particular topologies corresponding to the two slices.

Two FAs, two AIs, or one FA and one AI serve as two transmission planes being backups of each other. After the packet is copied at the ingress BFIR, the packet is transmitted in the two particular topologies.

Figure 5:
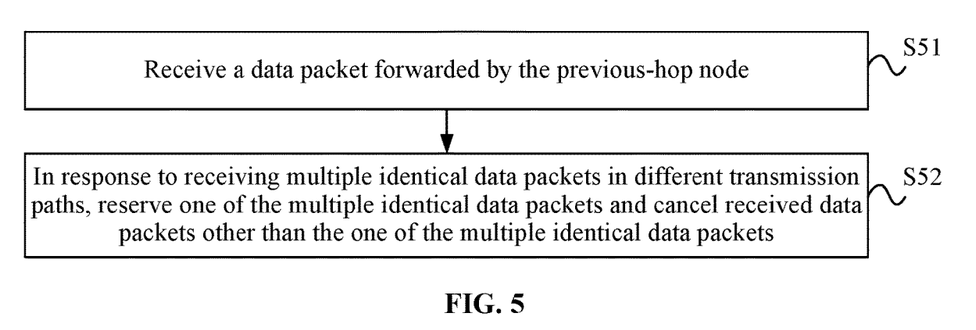
FIG. 5 is a flowchart of a packet cancellation method according to an embodiment of the present application.

In an embodiment, a packet cancellation method is provided. As shown in FIG. 5, the packet cancellation method of this embodiment includes S51 and S52. The method is applied to a second node.

In S51, a data packet forwarded by the previous-hop node is received.

In S52, in response to receiving multiple identical data packets in different transmission paths, one of the multiple identical data packets is reserved, and received data packets other than the one of the multiple identical data packets are cancelled.

The second node may be an intermediate forwarding node or an egress node.

When traffic is sent to a copy cancellation node such as an egress BFER, the copy cancellation node identifies duplicate traffic (if the duplicate traffic reaches the copy cancellation node) according to the backup relationship between the transmission planes being backups of each other and the unique flow identifier (how to uniquely identify a flow is not within the scope of the present application); and cancels the duplicate traffic. This ensures that the packet is not lost.

Thereby, the BIER technology can provide protection for data packet transmission, assure deterministic services, provide a correct copy cancellation operation, and ensure that transmitted traffic is not lost. Additionally, the present application is applicable to the BIER-Traffic Engineering (BIER-TE) technology in addition to the BIER technology.

In an embodiment, a method for advertisement of a particular topology identifier in a BIER domain is provided. In this embodiment, the particular topology identifier is an AI identifier by way of example.

Figure 6:
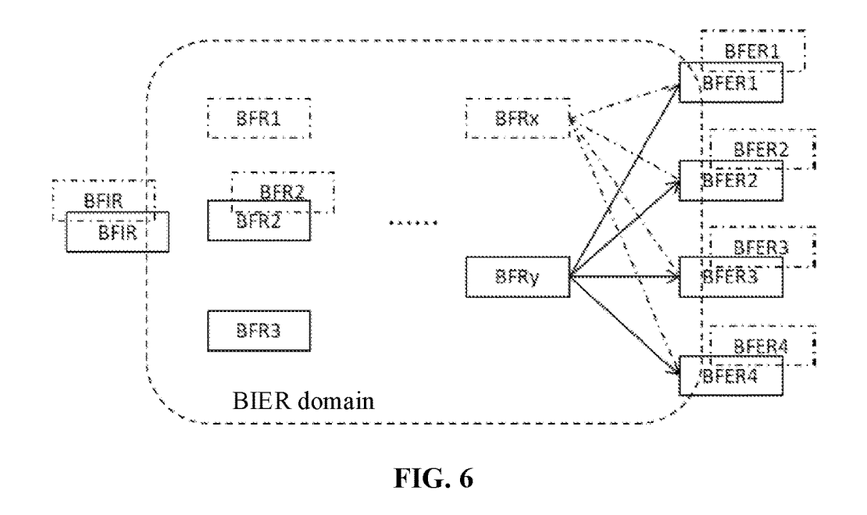
FIG. 6 is a diagram illustrating the structure of a BIER domain according to an embodiment of the present application.

As shown in FIG. 6, this network is a BIER domain having an ingress BFIR node, egress BFER nodes, and intermediate forwarding BFR nodes. For simplicity, only one BFIR node is shown in FIG. 6. In practice, however, the number of ingress nodes is not limited, more than one ingress node may be deployed, and a node may be both a BFIR and a BFER.

This network is divided into multiple AIs according to management requirements of a manager. The AIs may provide the same or different service assurances, thereby implementing bandwidth or delay requirements of services. When these nodes advertise BIER information through a routing protocol such as OSPF/ISIS/BGP/BABEL, advertisement of the AI identifier is added.

Figure 7:
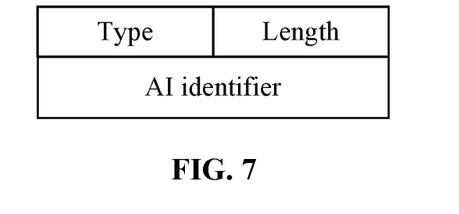
FIG. 7 is a diagram illustrating the structure of a sub-sub-TLV carrying an AI identifier according to an embodiment of the present application.

The AI identifier may be added to the BIER information in the following manner: A sub-sub-TLV carrying the AI identifier is added when the ISIS protocol in RFC8401 advertises BIER Info sub-TLV.

As shown in FIG. 6, it is assumed that each of link 1 of the BFIR node, link 1 of BFR1 and BFR2 nodes, link 1 of BFRx and BFER1/2/3/4 (i.e., BFER1, BFER2, BFER3 and BFER4) carries AII value 1; and each of link 2 of the BFIR, link 2 of the BFR2, link 2 of the BFR3, BFRy, and BFER1/2/3/4 carries AII value 2. These AII values are to be advertised with the corresponding advertisement of a routing protocol. The nodes in dashed boxes and dashed connection lines of FIG. 6 indicate nodes in link 1 and link 1. The nodes in solid boxes and dashed connection lines of FIG. 6 indicate nodes in link 2 and link 2.

When a BIER forwarding table entry of each node is calculated, the AI identifier may be taken into account, a node or link involving different AI identifiers is not to be used to generate a BIER forwarding table entry. When BFR1 in the dashed box of FIG. 6 calculates the path to BFER1, the shortest path points to the next-hop node BFRy when AII information is not taken into account while the next-hop node BFRx belonging to the same AI identifier is calculated when AII information is taken into account.

This enables different AIs to be supported in BIER. BIER supports different slice processing when the AI identifier is associated with a slice, for example, when AI identifier 1 is associated with slice 1 and AI identifier 2 is associated with slice 2.

Using the AI identifier as an example, the particular topology identifier in BIER is processed in the process below.

In step 1101, the AI identifier is added to a routing protocol and advertised by the routing protocol throughout the network when the routing protocol advertises BIER information.

In step 1102, each node in the network receives BIER information of other nodes.

In step 1103, each node generates a BIER forwarding table entry corresponding to a particular topology according to the BIER information.

The value of the AI identifier may be explicit or implicit in the forwarding table entry.

This is not limited in this embodiment.

In an embodiment, a method for binding a slice to a subdomain of the BIER domain is provided.

A slice may be directly mapped to an SD based on the same node and link and different topology management requirements due to the SD mechanism of BIER when the slice requirement matches a service provided in the SD. For example, slice 1 may be associated with SD1, and slice 2 may be associated with SD2.

When a slice is uniquely bound to an SD, the slice value may not be advertised. For example, slice 1 is uniquely bound to SD1. Thus, a routing protocol may not advertise the slice identifier value or may explicitly advertise the identifier value, for example, the slice number.

Figure 8:
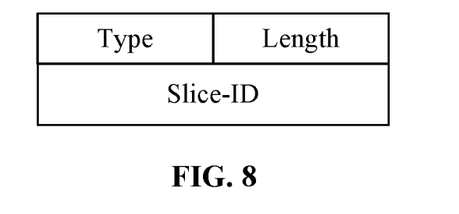
FIG. 8 is a diagram illustrating the structure of a sub-TLV of a slice number according to an embodiment of the present application.

When multiple slices are associated with the same SD, for example, when slice 2 and slice 3 are both associated with SD2, a routing protocol requires to perform the extension advertisement; otherwise, the routing protocol cannot recognize that there are two slices in this SD. When the routing protocol performs the extension advertisement, a sub-TLV advertisement of the slice number may be added in a manner similar to the manner in which the AII is advertised. See FIG. 8.

Additionally, the BIER technology may be used as a basis for a slice service. In this case, the slice identifier does not require to be advertised inside BIER, but BIER provides a multicast service for the slice.

The advertisement process of the slice identifier is the same as the advertisement process of the AI identifier in the previous embodiment and thus is not described here.

In an embodiment, a data plane encapsulation method is provided.

When a data packet is BIER-encapsulated at BFIR, a particular topology identifier may be written into a BIER packet header, or identifier information such as slice/AII/FAID (slice, AII or FAID) information may be encapsulated into a BIER packet header. The data packet may be encapsulated in the following manner: The particular identifier value may be indicated by the first 8 bits of a BIFT-ID or the first 8 bits of an entropy. At the same time, the particular topology identifier bit in the reserved field may be set to 1. The 8 bits here are illustrated by way of example. This value may be determined by the number of particular topologies in a practical network.

In addition to the reserved field, the most significant bit in the BIFT-ID field or the entropy field may indicate that the packet contains a special topology identifier carrying information. For example, the most significant bit set to 1 indicates that the subsequent 8 bits indicate a slice identifier value.

For example, when the data packet of slice 1 is BIER-encapsulated at BFIR, if slice 1 is not uniquely associated with SD1, slice identifier information may not be encapsulated in the BIER packet. Slice 2 and slice 3 are not uniquely associated with SD2. When traffic of slice 2 is BIER-encapsulated at BFIR, to differentiate traffic of slice 2 from traffic of slice 3, it is required to encapsulate slice 2 identifier information in the BIER packet. When traffic of slice 3 is BIER-encapsulated, processing is performed in the same manner as traffic of slice 2 is processed.

Figure 9:
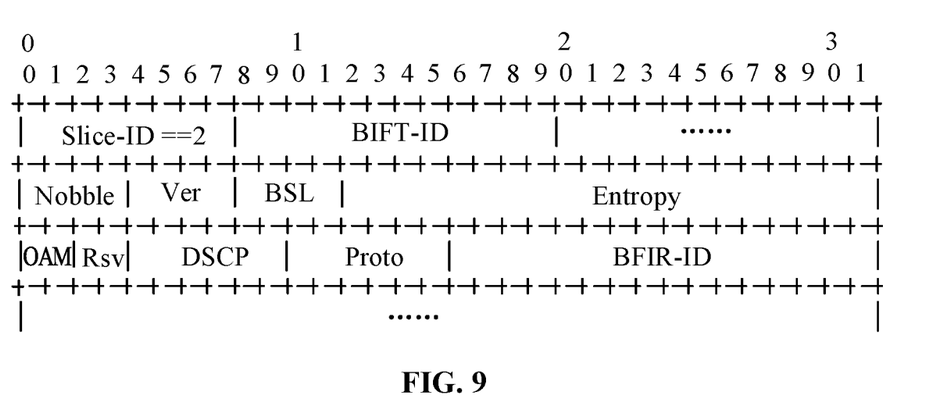
FIG. 9 is a diagram illustrating that part of a BIFT-ID indicates a slice value according to an embodiment of the present application.
Figure 10:
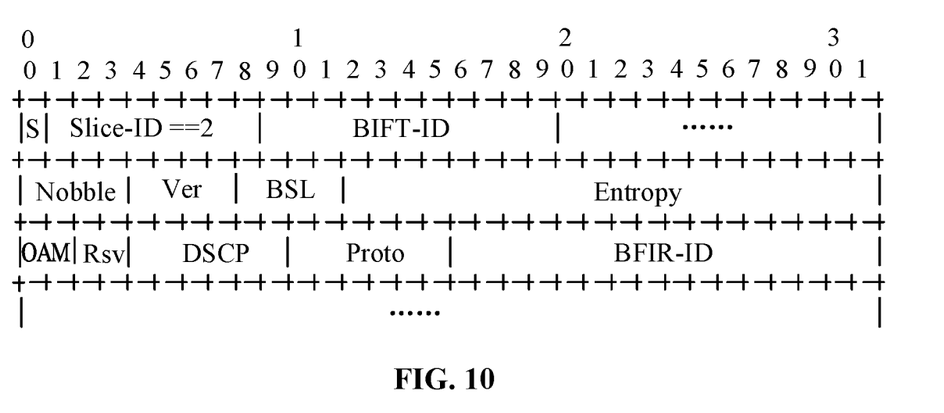
FIG. 10 is a diagram illustrating that part of a BIFT-ID indicates a slice value according to an embodiment of the present application.

For example, FIGS. 9 and 10 show that part of the BIFT-ID indicates a slice value. FIG. 9 shows that the first 8 bits of the BIFT-ID are set to 2 to indicate slice 2. FIG. 10 shows that the most significant bit of the BIFT-ID is set to the slice identifier, and the subsequent 8 bits of the BIFT-ID are set to 2 to indicate slice 2.

Figure 11:
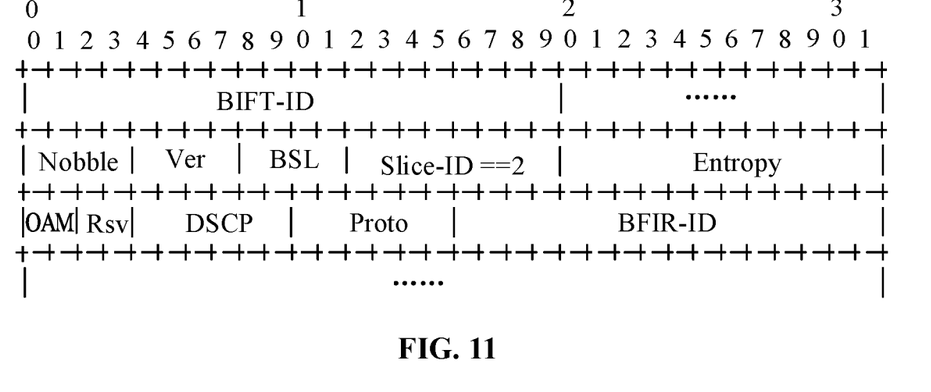
FIG. 11 is a diagram illustrating that part of an entropy indicates a slice value according to an embodiment of the present application.
Figure 12:
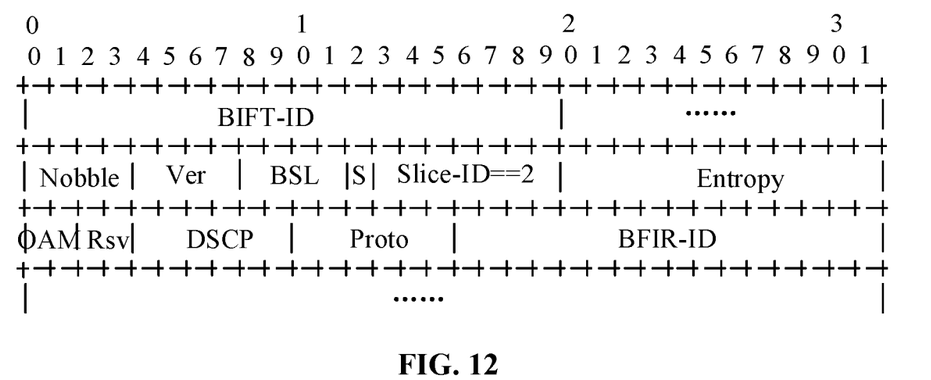
FIG. 12 is a diagram illustrating that part of an entropy indicates a slice value according to an embodiment of the present application.

For example, FIGS. 11 and 12 show that part of the entropy indicates a slice value. FIG. 11 shows that the first 8 bits of the entropy are set to 2 to indicate slice 2. FIG. 12 shows that the most significant bit of the entropy is set to the slice identifier, and the subsequent 8 bits of the entropy are set to 2 to indicate slice 2.

When a slice is bound to an AII or an FAID, the AII value or the FAID value may be embedded in the preceding position, and the slice value is not used.

The 8 bits here are illustrated by way of example. This value may vary with the actual situation and the varied values are all within the scope of the present application.

When the encapsulated traffic is forwarded in a BIER domain, each node performs the corresponding service assurance processing according to particular topology information such as the slice value, the AII value, or the FAID value. For example, the encapsulated traffic is forwarded to the next-hop node belonging to the same AII, and the corresponding assurance processing of delays or bandwidths is performed. In FIG. 6, for example, it is assumed that a dashed box indicates an instance in which the AII is 1, and a solid box indicates an instance in which the AII is 2. In this case, it is ensured that forwarding is performed in a consistent instance instead of another instance.

Using encapsulation of an AII in the packet as an example, the processing flow of a node is as below.

1. With regard to an encapsulation node BFIR, the processing flow is as below.

In step 3101, the BFIR receives the data packet and determines whether the data packet requires to be applied to a particular topology such as an AII.

In step 3102, if the corresponding particular topology has been uniquely associated with, for example, an SD, no special encapsulation processing is required for the BIER packet header.

In step 3103, if the corresponding particular topology such as an AII is not uniquely associated with, for example, an SD, the AII is encapsulated in the BIER packet header.

In step 3104, the BFIR forwards the packet to the next-hop node according to a forwarding table entry related to the AII.

2. With regard to a forwarding node BFR, the processing flow is as below.

In step 3201, the BFR receives the data packet and identifies whether there is a particular topology identifier such as an AII.

In step 3202, if the packet contains an AII, the BFR identifies the AII, performs processing according to the corresponding BIER forwarding table entry, and provides a corresponding service assurance function.

In step 3203, the BFR forwards the packet to the next-hop node according to the corresponding BIER forwarding table entry.

3. With regard to an egress node BFER, the processing flow is as below.

In step 3301, the BFER receives the data packet and identifies whether there is a particular topology identifier such as an AII.

In step 3302, if the packet contains an AII, the BFER identifies the AII, performs processing according to the corresponding BIER forwarding table entry, and performs service assurance of delays or bandwidths.

In step 3303, the BFER removes the BIER header from the packet and forwards the packet to a user according to the inner-layer packet.

In an embodiment, the BIER domain may be divided into different particular topologies by a particular topology identifier such as an SD, a slice, an AII, or an FAID. Different topologies may provide the same or different service protections and assurances. A simple method is provided for service protection and deterministic forwarding.

Figure 13:
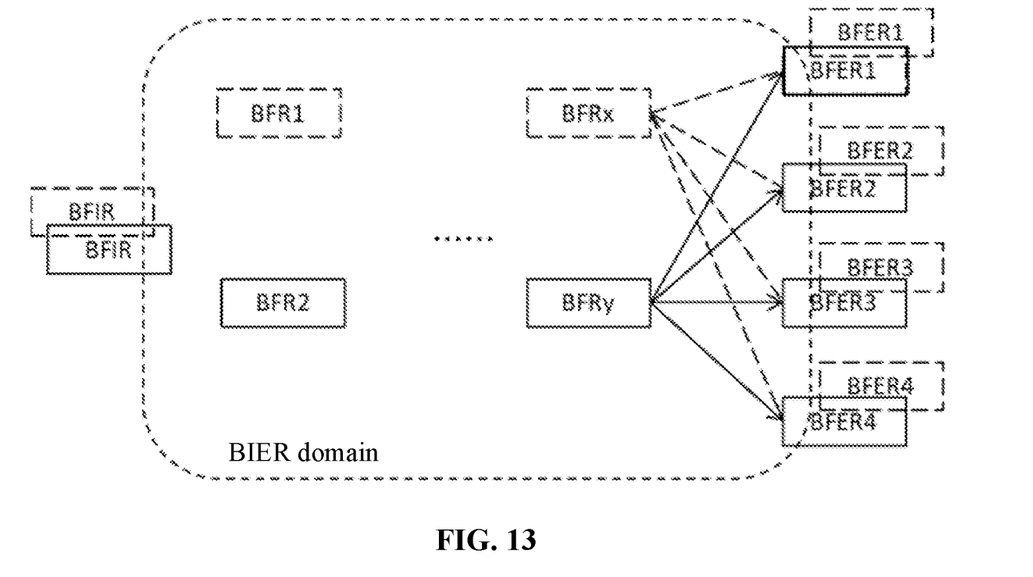
FIG. 13 is a diagram illustrating the structure of a BIER domain according to an embodiment of the present application.

For example, SDs of two different topologies may provide the same service assurance function, that is, the same piece of traffic may flow into two sub-domains (SDs), thereby achieving the effect of performing forwarding in different forwarding planes. In this manner, even if traffic in one forwarding plane is lost, traffic in the other forwarding plane can reach the destination. As shown in FIG. 13, assuming that a dashed box indicates SD1, a solid box indicates SD2, and the destination of one piece of traffic is BFER1/2/3/4, then the traffic may be copied on the BFIR, and two pieces of traffic may flow into SD1 and SD2 simultaneously and are forwarded in SD1 and SD2 normally until reaching the destination BFER1/2/3/4.

It is assumed that the network provides services for Ethernet VPN (EVPN), and the BUM traffic of EVPN requires to reach BFER1/2/3/4, if the BUM traffic is lost, the BUM traffic may be repeatedly retransmitted, but a node that has received the traffic does not require to receive the retransmitted traffic, so deterministic assurance is of great importance to preformed on the service.

If both of the two pieces of traffic reach the destination node, copy cancellation is required because one piece of traffic is duplicate traffic. It is assumed that BFER1/2/3/4 learns, according to configuration, that SD1 and SD2 are backups of each other, and cancel redundant traffic after it is identified, according to traffic identifiers, that the two pieces of traffic are the same (how to identify the same traffic is not within the present application).

In addition to edge BFIR and BFER nodes, an intermediate forwarding node, for example, BFR2 of FIG. 13, may be a copy cancellation node. When receiving duplicate traffic, BFR2 may cancel redundant traffic, recopy the traffic, put the traffic into two SDs, and then forward the traffic.

Using two particular topologies protecting each other in FIG. 13 as an example, the processing flow of a node is as below.

Processing by an Ingress Node

In step 4101, after a BFIR receives a data packet and finds that particular topology 1 and particular topology 2 in the data packet provide a protection or deterministic transmission function, the BFIR copies the packet.

In step 4102, when encapsulating the two data packets, the BFIR determines, according to requirements, whether to explicitly encapsulate a particular topology identifier such as an AII into the BIER packet.

In step 4103, the BFIR forwards the two data packets to the next-hop node according to a BIER forwarding table of particular topology 1 and a BIER forwarding table of particular topology 2.

Processing by a Forwarding Node

In step 4201, after a BFR receives a data packet, if the BFR is not a copy cancellation node, the BFR performs normal service assurance and forwarding processing according to steps of the preceding embodiments.

In step 4202, if the BFR is a copy cancellation node, the BFR buffers the packet or packet key information and when receiving the same data packet of another particular topology, performs cancellation.

In step 4203, like an ingress node, the BFR performs copy and encapsulation operations on the data packet such that the data packet is forwarded, in the two particular topologies, to the next-hop node separately.

Processing by a Tail Egress Node

In step 4301, after a BFER receives a data packet, the BFER performs corresponding service assurance processing if there is particular topology identifier information.

In step 4302, the BFER buffers the packet or packet key information and when receiving the same data packet of another particular topology, performs cancellation.

In step 4303, the BFER removes a BIER header from the packet and forwards the packet according to the inner-layer packet.

In different deployment modes, methods in the preceding embodiments may be used independent of each other or used in combination so that the BIER technology refines a particular topology and achieves a combination with AII, FAID, slice, and other technologies, thereby achieving differentiated service assurances and protections by the BIER technology, implementing the copy cancellation function in deterministic assurance, and enlarging the application scenario of the BIER technology. The present application is also applicable to the BIER-TE technology.

In an embodiment, an information advertisement apparatus is provided. The information advertisement apparatus of this embodiment includes an association module and an advertisement module.

The association module is configured to associate a particular topology identifier with a BIER forwarding plane when constructing a particular topology. The advertisement module is configured to advertise BIER information to a network, where the BIER information carries the particular topology identifier, and the BIER information is configured to be used by a node in the network to generate a BIER forwarding table entry corresponding to the particular topology.

In an example embodiment, the particular topology identifier includes at least one of the following: an administrative instance (AI) identifier or a slice identifier.

In an example embodiment, the BIER information carries only the AI identifier when a mapping exists between the AI identifier and the slice identifier.

In an example embodiment, associating the particular topology identifier with the BIER forwarding plane includes at least one of the following: associating the particular topology identifier with a subdomain in a BIER domain; associating the particular topology identifier with a bit forwarding router prefix in a BIER domain; associating the particular topology identifier with a bit forwarding router identifier in a BIER domain; associating the particular topology identifier with a BIER domain; or associating the particular topology identifier with a particular topology of a subdomain in a BIER domain.

In an example embodiment, when multiple slice identifiers are associated with one subdomain in the BIER domain, the BIER information carries a sub-type-length-value field of each slice identifier.

In an embodiment, a packet forwarding apparatus is provided. The packet forwarding apparatus is configured on a first node. The packet forwarding apparatus of this embodiment includes an encapsulation module, a forwarding table entry determination module, and a first forwarding module.

The encapsulation module is configured to encapsulate a particular topology identifier into a BIER packet header when a to-be-forwarded data packet is encapsulated. The forwarding table entry determination module is configured to determine a BIER forwarding table entry associated with the particular topology identifier. The first forwarding module is configured to forward the encapsulated to-be-forwarded data packet to the next-hop node based on the BIER forwarding table entry.

In an example embodiment, encapsulating the particular topology identifier into the BIER packet header includes at least one of the following: implicitly carrying the particular topology identifier in the BIER packet header; or explicitly carrying the particular topology identifier in the BIER packet header.

In an example embodiment, explicitly carrying the particular topology identifier in the BIER packet header includes at least one of the following: indicating the particular topology identifier by using a preset number of bits in a BIFT identifier; indicating the particular topology identifier by using a preset number of bits in an entropy field in the BIER packet header; or indicating the particular topology identifier by using a preset number of bits in a reserved field in the BIER packet header.

In an example embodiment, when a node in a network does not have the capability of processing the particular topology identifier, explicitly carrying the particular topology identifier in the BIER packet header includes at least one of the following: setting the most significant bit in a reserved field in the BIER packet header to a first state; setting the most significant bit in an entropy field in the BIER packet header to a first state; or setting the most significant bit in a BIFT identifier to a first state, where the first state is configured to indicate that the to-be-forwarded data packet requires to be processed by using the particular topology identifier.

In an example embodiment, implicitly carrying the particular topology identifier in the BIER packet header includes at least one of the following: when the particular topology identifier is in one-to-one association with a subdomain in a BIER domain, implicitly carrying the particular topology identifier in the subdomain in the BIER domain; when the particular topology identifier is in one-to-one association with a bit forwarding router prefix in a BIER domain, implicitly carrying the particular topology identifier in the bit forwarding router prefix in the BIER domain; or when the particular topology identifier is in one-to-one association with a bit forwarding router identifier in a BIER domain, implicitly carrying the particular topology identifier in the bit forwarding router identifier in the BIER domain.

In an embodiment, a packet forwarding apparatus is provided. The packet forwarding apparatus is configured on a second node. The packet forwarding apparatus of this embodiment includes a first receiving module and a processing module.

The first receiving module is configured to receive a data packet forwarded by the previous-hop node. The processing module is configured to, in response to identifying that a packet header of the data packet carries a special topology identifier, provide, for the data packet, processing matching the special topology identifier.

The packet forwarding apparatus of this embodiment may perform the packet forwarding method of any embodiment of the present application and has function modules and effects corresponding to the performed method. For details not described in this embodiment, reference may be made to the packet forwarding method of any embodiment of the present application.

Units and modules in the embodiment of the packet forwarding apparatus are divided according to function logic or divided in any other manner as long as the corresponding functions can be achieved. Additionally, the names of the function units are intended to distinguish between the function units and not to limit the scope of embodiments of the present application.

In an embodiment, a packet transmission apparatus is provided. The packet transmission apparatus is configured on a first node. The packet transmission apparatus of this embodiment includes a second receiving module and a second forwarding module.

The second receiving module is configured to copy a received data packet. The second forwarding module is configured to forward the copied data packet to the next-hop node through different BIER transmission paths.

In an example embodiment, copying the received data packet includes in response to protecting the data packet by a first particular topology and a second particular topology, copying the received data packet.

In an example embodiment, transmitting the copied data packet through the different BIER transmission paths includes setting multiple subdomains in a BIER to be transmission planes being backups of each other; and transmitting the copied data packet in the multiple subdomains.

In an example embodiment, transmitting the copied data packet through the different BIER transmission paths includes setting multiple slices to be transmission planes which are backups of each other; and transmitting the copied data packet in a particular topology corresponding to the multiple slices.

The packet transmission apparatus of this embodiment may perform the packet transmission method of any embodiment of the present application and has function modules and effects corresponding to the performed method. For details not described in this embodiment, reference may be made to the packet transmission method of any embodiment of the present application.

Units and modules in the embodiment of the packet transmission apparatus are divided according to function logic or divided in any other manner as long as the corresponding functions can be achieved. Additionally, the names of the function units are intended to distinguish between the function units and not to limit the scope of embodiments of the present application.

In an embodiment, a packet cancellation apparatus is provided. The packet cancellation apparatus is configured on a second node. The packet cancellation apparatus of this embodiment includes a third receiving module and a third forwarding module.

The third receiving module is configured to receive a data packet forwarded by the previous-hop node. The third forwarding module is configured to, in response to receiving multiple identical data packets in different transmission paths, reserving one of the multiple identical data packets and cancelling received data packets other than the one of the multiple identical data packets.

The packet cancellation apparatus of this embodiment may perform the packet cancellation method of any embodiment of the present application and has function modules and effects corresponding to the performed method. For details not described in this embodiment, reference may be made to the packet cancellation method of any embodiment of the present application.

Units and modules in the embodiment of the packet cancellation apparatus are divided according to function logic or divided in any other manner as long as the corresponding functions can be achieved. Additionally, the names of the function units are intended to distinguish between the function units and not to limit the scope of embodiments of the present application.

Figure 14:
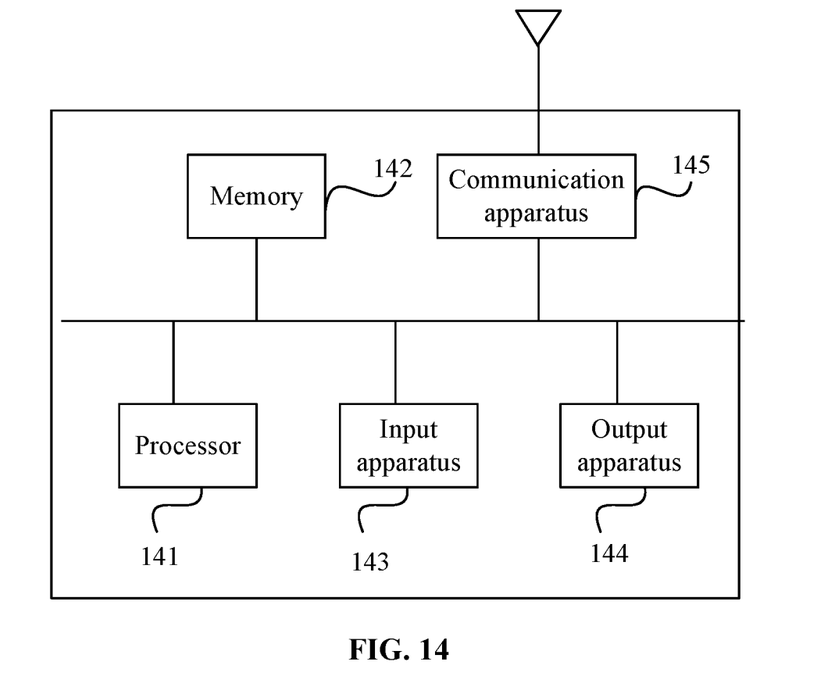
FIG. 14 is a diagram illustrating the structure of a device according to an embodiment of the present application.

An embodiment of the present application provides a device. FIG. 14 is a diagram illustrating the structure of the device according to this embodiment of the present application. As shown in FIG. 14, the device includes a processor 141, a memory 142, an input apparatus 143, an output apparatus 144, and a communication apparatus 145. One or more processors 141 may be provided in the device. One processor 141 is used as an example in FIG. 14. The processor 141, the memory 142, the input apparatus 143, and the output apparatus 144 in the device may be connected through a bus or in another manner. In FIG. 14, connection through a bus is performed by way of example.

The memory 142, as a computer-readable storage medium, is configured to store software programs, computer-executable programs, and modules. The processor 141 executes the software programs, instructions, and modules stored in the memory 142 to perform various function applications and data processing, that is, to perform the method of any embodiment of the present application.

The memory 142 may mainly include a program storage region and a data storage region, where the program storage region may store an operating system and an application program required by at least one function while the data storage region may store data created depending on use of a device. Additionally, the memory 142 may include a high-speed random-access memory and may also include a non-volatile memory such as at least one disk memory, flash memory, or another nonvolatile solid-state memory. In some examples, the memory 142 may include memories which are remotely disposed relative to the processor 141, and these remote memories may be connected to the device via a network. Examples of the preceding network include, but are not limited to, the Internet, an intranet, a local area network, a mobile communication network, and a combination thereof.

The input apparatus 143 may be configured to receive inputted digital or character information and generate key signal input related to user settings and function control of the device. The output apparatus 144 may include a display device such as a display screen.

The communication apparatus 145 may include a receiver and a transmitter. The communication apparatus 145 is configured to perform information transceiving and communication under the control of the processor 141.

In an example embodiment of the present application, a storage medium including computer-executable instructions is provided. When the computer-executable instructions are executed by a computer processor, an information advertisement method is performed. The information advertisement method includes associating a particular topology identifier with a BIER forwarding plane when constructing a particular topology; and advertising BIER information to a network, where the BIER information carries the particular topology identifier, and the BIER information is configured to be used by a node in the network to generate a BIER forwarding table entry corresponding to the particular topology.

In the storage medium of this embodiment of the present application, when the computer-executable instructions are executed, not only the preceding method operations, but also related operations in the information advertisement method of any embodiment of the present application are implemented.

In an example embodiment of the present application, a storage medium including computer-executable instructions is provided. When the computer-executable instructions are executed by a computer processor, a packet forwarding method is performed. The packet forwarding method is applied to a first node. The packet forwarding method includes encapsulating a particular topology identifier into a BIER packet header when a to-be-forwarded data packet is encapsulated; determining a BIER forwarding table entry associated with the particular topology identifier; and forwarding the encapsulated to-be-forwarded data packet to the next-hop node based on the BIER forwarding table entry.

In the storage medium of this embodiment of the present application, when the computer-executable instructions are executed, not only the preceding method operations, but also related operations in the packet forwarding method of any embodiment of the present application are implemented.

In an example embodiment of the present application, a storage medium including computer-executable instructions is provided. When the computer-executable instructions are executed by a computer processor, a packet forwarding method is performed. The packet forwarding method is applied to a second node. The packet forwarding method includes receiving a data packet forwarded by the previous-hop node; and in response to identifying that a packet header of the data packet carries a special topology identifier, providing, for the data packet, processing matching the special topology identifier.

In the storage medium of this embodiment of the present application, when the computer-executable instructions are executed, not only the preceding method operations, but also related operations in the packet forwarding method of any embodiment of the present application are implemented.

In an example embodiment of the present application, a storage medium including computer-executable instructions is provided. When the computer-executable instructions are executed by a computer processor, a packet transmission method is performed. The packet transmission method is applied to a first node. The packet transmission method includes copying a received data packet; and forwarding the copied data packet to the next-hop node through different BIER transmission paths.

In the storage medium of this embodiment of the present application, when the computer-executable instructions are executed, not only the preceding method operations, but also related operations in the packet transmission method of any embodiment of the present application are implemented.

In an example embodiment of the present application, a storage medium including computer-executable instructions is provided. When the computer-executable instructions are executed by a computer processor, a packet cancellation method is performed. The packet cancellation method is applied to a second node. The packet cancellation method includes receiving a data packet forwarded by the previous-hop node; and in response to receiving multiple identical data packets in different transmission paths, reserving one of the multiple identical data packets and cancelling received data packets other than the one of the multiple identical data packets.

In the storage medium of this embodiment of the present application, when the computer-executable instructions are executed, not only the preceding method operations, but also related operations in the packet cancellation method of any embodiment of the present application are implemented.

From the preceding description of embodiments, the present application may be implemented by both software and required general-purpose hardware or by hardware. The technical solutions of the present application may be essentially embodied in the form of a software product. The software product in a computer may be stored in a computer-readable storage medium such as a floppy disk, a read-only memory (ROM), a random-access memory (RAM), a flash memory, a hard disk or an optical disc in the computer and includes several instructions for enabling a computer device (which may be a personal computer, a server or a network device) to perform the method of the embodiments of the present application.

The term user terminal encompasses any appropriate type of wireless user device such as a mobile phone, a portable data processing apparatus, a portable web browser or a vehicle-mounted mobile station.

In general, various embodiments of the present application may be implemented in hardware or special-purpose circuits, software, logics, or any combination thereof. For example, some aspects may be implemented in hardware while other aspects may be implemented in firmware or software executable by a controller, a microprocessor, or another computing apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable for a local technical environment and may be implemented using any suitable data storage technology, such as, but not limited to, a read-only memory (ROM), a random access memory (RAM) and an optical memory apparatus and system (a digital video disc (DVD) or a compact disk (CD)). Computer-readable media may include non-transitory storage media. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA), or a processor based on a multi-core processor architecture.

What is claimed is:

1. An information advertisement method, comprising:
   associating a particular topology identifier with a bit indexed explicit replication (BIER) forwarding plane in a case where a particular topology is constructed, wherein the particular topology identifier comprises an administrative instance (AI) identifier and a slice identifier; and
   advertising BIER information to a network, wherein the BIER information carries the particular topology identifier, and the BIER information is configured to be used by a node in the network to generate a BIER forwarding table entry corresponding to the particular topology,
   wherein associating the particular topology identifier with the BIER forwarding plane comprises:
   associating the particular topology identifier with a subdomain in a BIER domain.

2. The information advertisement method of claim 1, wherein in a case where a plurality of slice identifiers are associated with one subdomain in the BIER domain, the BIER information carries a sub-type-length-value (sub-TLV) field of each of the plurality of slice identifiers.

3. The information advertisement method of claim 1, wherein associating the particular topology identifier with the BIER forwarding plane further comprises at least one of the following:
   associating the particular topology identifier with a bit forwarding router prefix in the BIER domain;
   associating the particular topology identifier with a bit forwarding router identifier in the BIER domain;
   directly associating the particular topology identifier with the BIER domain; or
   associating the particular topology identifier with a particular topology of the subdomain in the BIER domain.

4. A device, comprising:
   at least one processor; and
   a memory configured to store at least one program,
   wherein the at least one program is configured to, when executed by the at least one processor, cause the at least one processor to perform:
   associating a particular topology identifier with a bit indexed explicit replication (BIER) forwarding plane in a case where a particular topology is constructed, wherein the particular topology identifier comprises an administrative instance (AI) identifier and a slice identifier; and
   advertising BIER information to a network, wherein the BIER information carries the particular topology identifier, and the BIER information is configured to be used by a node in the network to generate a BIER forwarding table entry corresponding to the particular topology;
   wherein associating the particular topology identifier with the BIER forwarding plane comprises:
   associating the particular topology identifier with a subdomain in a BIER domain.

5. The device of claim 4, wherein associating the particular topology identifier with the BIER forwarding plane further comprises at least one of the following:
   associating the particular topology identifier with a bit forwarding router prefix in the BIER domain;
   associating the particular topology identifier with a bit forwarding router identifier in the BIER domain;
   directly associating the particular topology identifier with the BIER domain; or
   associating the particular topology identifier with a particular topology of the subdomain in the BIER domain.

6. A non-transitory storage medium, storing a computer program which, when executed by a processor, causes the processor to perform:
   associating a particular topology identifier with a bit indexed explicit replication (BIER) forwarding plane in a case where a particular topology is constructed, wherein the particular topology identifier comprises an administrative instance (AI) identifier and a slice identifier; and
   advertising BIER information to a network, wherein the BIER information carries the particular topology identifier, and the BIER information is configured to be used by a node in the network to generate a BIER forwarding table entry corresponding to the particular topology;

wherein associating the particular topology identifier with the BIER forwarding plane comprises:
associating the particular topology identifier with a subdomain in a BIER domain.

7. The non-transitory storage medium of claim 6, wherein associating the particular topology identifier with the BIER forwarding plane further comprises at least one of the following:
associating the particular topology identifier with a bit forwarding router prefix in the BIER domain;
associating the particular topology identifier with a bit forwarding router identifier in the BIER domain;
directly associating the particular topology identifier with the BIER domain; or
associating the particular topology identifier with a particular topology of the subdomain in the BIER domain.

* * * * *